UNITED STATES PATENT OFFICE.

SIMON RUDOLPH OPPENHEIM, OF KEELER, CALIFORNIA.

PROCESS FOR RECOVERY OF PURE POTASSIUM SALTS FROM KELP AND LIKE MATERIALS.

1,283,547.        Specification of Letters Patent.        Patented Nov. 5, 1918.

No Drawing.      Application filed June 7, 1917. Serial No. 173,370.

*To all whom it may concern:*

Be it known that I, SIMON RUDOLPH OPPENHEIM, a citizen of the United States of America, residing at Keeler, in the county of Inyo and State of California, have invented a new and useful Process for Recovery of Pure Potassium Salts from Kelp and like Materials, of which the following is a specification.

This invention relates to recovery of pure or substantially pure potassium salt from kelp or other vegetable matter containing potassium compounds. In any process for successful commercial production of pure potassium salt from kelp or like material the use of chemicals or other reagents is impracticable, on account of the cost of such reagents and of the operations involved in their use, which would make the cost of production so high as to prevent the sale of the potassium salt at a profit.

In processes now in commercial use, the kelp is incinerated or subjected to the action of heat to cause the potassium content to become water soluble, and the resulting char or ash is then leached to extract the potassium compounds. It is usual to carry on the incineration at a high temperature, say about 1600° centigrade, in order to destroy or drive off organic matter as far as possible, and decrease the amount of organic impurities taken up in leaching, for the purpose of facilitating the recovery of the potassium salt obtained by leaching such ash. Such a procedure is, however, objectionable on account of the cost of fuel required for high temperature incineration and also because of loss of considerable of the potassium compound, as well as of iodin, by volatilization and moreover, such procedure is not fully effective, in that some organic salts are left in the ash and prevent the production of a pure potassium salt. Such high temperature incineration also has the disadvantage that by the action of the carbon dioxid in the burner gases a considerable portion of the potassium compound is converted to the form of carbonate, which is not desired in the present case, as it complicates the subsequent separation of potassium compound from the leach liquor. These objections may be avoided by carbonizing of the kelp at a comparatively low temperature and with a suitable restriction of air supply so as to char or partly char the organic matter without removing the organic salts present. By this means it is possible to retain substantially all of the potassium and iodin in the char in a water soluble condition. The liquor resulting from the leaching of such char contains, however, in addition to potassium compound, a considerable quantity of organic matter, particularly organic salts, in solution, these organic salts making it extremely difficult to separate the potassium compound in pure condition therefrom. This results from the tendency of the organic salts to interfere with the crystallization or precipitation of potassium salt and to become deposited or precipitated along with such potassium salt so as to render it unsalable as a pure product. I have found, however, that by the procedure hereinafter set forth, it is possible to separate the potassium salt from such liquors resulting from the leaching of kelp-char in such manner as to produce a pure or substantially pure potassium salt at minimum expense of labor, time and return.

In other words it has been deemed sufficient to subject the kelp char liquor or kelp ash liquor to an ordinary mechanical filtration so as to remove suspended matter before crystallization of the potassium chlorid. I have discovered that this is not sufficient and that the contamination of the liquor by organic substances not removable by ordinary mechanical filtration was the cause of serious difficulties in utilizing the product for certain purposes. For example it is these organic substances, remaining in the liquor after ordinary filtration, and contaminating the crystallized product, that has led to the troubles experienced in using potassium chlorid produced from kelp in making munitions, since even a slight contamination with these organic substances causes gradual deterioration of the explosive products produced from such slightly impure potassium chlorid.

The main object of my present invention is to provide for obtaining the potassium salt from the kelp liquor, containing such organic impurities, without the use of chemicals, and with minimum expense.

Another object of the invention is to provide for obtaining the potassium content in the form of a single salt, namely, the chlorid, in such manner as to simplify its recovery and sale.

In my present process the liquor resulting from leaching kelp-char or like vegetable material, containing potassium compounds together with organic substances, is filtered through bone char or bone black, with the result that the organic matter present, whether in suspension or solution, is removed from the liquor, and the resulting liquor, substantially free from objectionable organic compounds, particularly organic salts, is then subjected to fractional cystallization to separate the potassium compounds therefrom.

My process is preferably carried out as follows: The kelp or like material is dried and charred, in any suitable manner, for example, as set forth in Patent No. 1,141,482, granted to me, June 1, 1915, in such manner as to produce kelp-char, and the resulting char is then leached with water (preferably by the method of diffusion as set forth in my application of even date,) producing a liquor containing chlorids, iodids, bromids, phosphates, sulfates, sulfids, sulfites and thiosulfates of potassium, sodium, calcium and magnesium, and also containing organic substances, especially organic salts, such as acetates and oxalates of calcium and magnesium. The process is preferably so carried out as to produce a liquor which has, at 17° C., a specific gravity of 1.2 or 24.5° Bé. This liquor is physically and chemically purified by passing it through a tank filled with or containing bone black or bone char of coarse granular form. This filtration removes the organic matter, and particularly it removes the organic salts above referred to, leaving the solution in condition for effective and economical separation of the potassium salt, which may be effected as follows:

The liquor or filtrate passing from the bone-black filtration, at a temperature of 17° C., and a specific gravity of 24° Bé., is heated and evaporated at a temperature of 88° C. and the solution then allowed to stand, say from one to two hours until the temperature has fallen to 75° C. Care must be taken not to cool the solution below 72° C. as potassium chlorid and magnesium chlorid would then crystallize at the same time. The liquid is then transferred from the evaporating tank to another evaporating tank and heated until it shows a density of 25° Bé. (hot) equivalent to $29\frac{6}{10}°$ (cold). This hot and concentrated solution is then transferred to a crystallizing tank and cooled off to about 17° C., which will generally take place in about 8 to 10 hours. The residue from the first evaporating tank consists of calcium sulfate, calcium carbonate, magnesium sulfate and ferric oxid, and most of the potassium chlorid contained in the kelp liquor is precipitated in the crystallizing tank as pure potassium chlorid, which, after separation from the last mother liquor, can, after being washed and dried in a centrifugal machine, be packed and sold as pure potassium chlorid. The mother liquor in the crystallizing tank, being freed from iodin by treatment with chlorin, or by electrolysis, can be evaporated to dryness, mixed with dry refuse carbon from the diffusion tank and sold as an excellent fertilizer of nearly 25% $K_2O$.

What I claim is:

In the process of purifying potassium salts obtained from kelp and like materials and containing organic substances the step of removing the organic substances which consists in filtering a solution of the impure salts through bone char.

In testimony whereof I have hereunto set my hand, at Keeler, California, this 21st day of May, 1917.

SIMON RUDOLPH OPPENHEIM.